(12) United States Patent
Balogh

(10) Patent No.: US 7,720,700 B2
(45) Date of Patent: May 18, 2010

(54) SYSTEM FOR PROCESSING UNPAID HEALTHCARE CLAIMS

(75) Inventor: Mary Balogh, Hollywood, FL (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 2050 days.

(21) Appl. No.: 10/608,254

(22) Filed: Jun. 27, 2003
(Under 37 CFR 1.47)

(65) Prior Publication Data

US 2005/0060185 A1    Mar. 17, 2005

Related U.S. Application Data

(60) Provisional application No. 60/423,471, filed on Nov. 4, 2002.

(51) Int. Cl.
*G06Q 40/00* (2006.01)

(52) U.S. Cl. ......................................................... 705/4

(58) Field of Classification Search ................. 705/2–4, 705/8
See application file for complete search history.

(56) References Cited

U.S. PATENT DOCUMENTS

| | | | |
|---|---|---|---|
| 4,491,725 A * | 1/1985 | Pritchard ........................ | 705/4 |
| 4,667,292 A | 5/1987 | Mohlenbrock et al. ...... | 364/406 |
| 5,359,509 A | 10/1994 | Little et al. .................. | 364/401 |
| 5,530,861 A * | 6/1996 | Diamant et al. ................ | 705/8 |
| 5,915,241 A * | 6/1999 | Giannini ........................ | 705/2 |
| 5,991,733 A | 11/1999 | Aleia et al. .................... | 705/8 |
| 6,341,265 B1 * | 1/2002 | Provost et al. ................. | 705/4 |
| 6,453,297 B1 | 9/2002 | Burks et al. .................... | 705/3 |

* cited by examiner

*Primary Examiner*—Gerald J. O'Connor
*Assistant Examiner*—Sheetal R Rangrej
(74) *Attorney, Agent, or Firm*—Alexander J. Burke

(57) ABSTRACT

A system and method processes unpaid healthcare claims related to reimbursement of a provision of healthcare to a patient in response to a rejection, a denial, or a lack of response to a submitted claim. An activity code is selected from a predetermined activity code set including codes identifying processing to be performed concerning rejected claim data in response to a received notification of a claim denial or rejection. The selected activity code is assigned to rejected claim data associated with the received notification. A task is scheduled, including performing processing concerning the rejected claim data, to derive corrected claim data including claim data supplemental to the rejected claim data and/or amended rejected claim data, in response to the assigned selected activity code. The corrected claim data is prepared for submission to a payer organization for payment.

17 Claims, 10 Drawing Sheets

200
Accounts Receivable
Workflow Management Units

300
Accounts Receivable
Workflow Management Process

FIG. 7

700
Rejection Unit
Table of Rejection Reasons 701 702

| REJECTION REASON | REJECTION ACTIVITY CODE | AUTO LETTER | BILL CORRECTION | MEDICAL RECORDS | BILL ATTACHMENT | PATIENT CONTACT | INS CO CALL | MOVE TO SELF PAY |
|---|---|---|---|---|---|---|---|---|
| POLICY NOT IN EFFECT THIS DOS | R1 | | | | | | | X |
| APPLIED TO DED/CO-PAY | R2 | | | | | | | X |
| MEMBER NOT ON FILE | R3 | | | | | X | | |
| OTHER COVERAGE INFO NEEDED | R4 | X | | | | X | | |
| ITEMIZED BILL REQUESTED | R5 | | | | X | | | |
| MEDICAL RECORDS REQUESTED | R6 | | | X | | | | |
| ADDL INFO REQUESTED | R7 | | | | | | X | |
| ADDL INFO REQUESTED/PATIENT | R8 | X | | | | X | | |
| ADDL INFO REQUESTED/PROVIDER | R9 | | | | | | X | |
| CLAIM FORM REQUIRED | R10 | X | | | | X | | |
| MISSING/INVALID DX CODE | R11 | | X | | | | | |
| MISSING/INVALID PROCEDURE CODE | R12 | | X | | | | | |
| MISSING/INVALID REVENUE CODE | R13 | | X | | | | | |
| IB AND UB NOT EQUAL/BILLING ERROR | R14 | | X | | | | | |
| ER REPORT REQUESTED | R15 | | | X | | | | |
| STUDENT INFO REQUIRED | R16 | X | | | | X | | |
| CLAIM PENDING REVIEW | R17 | | | | | | X | |
| CLAIM SENT TO TPA | R18 | | | | | | X | |
| MEDICARE EOMB REQUIRED | R19 | | | | X | | | |
| BABY NOT ADDED TO POLICY | R20 | X | | | | X | | |
| UB NEEDED FOR 1500 PROCESSING | R21 | | | | X | | | |
| DUPLICATE CLAIM | R22 | | | | | | X | |

900
Appeal Unit
Table of Denial Reasons

FIG. 9

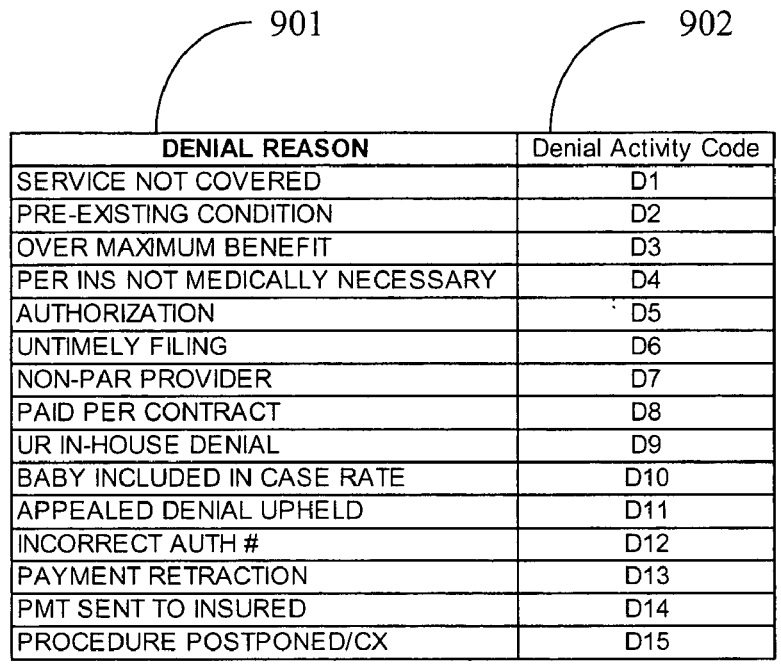

| DENIAL REASON | Denial Activity Code |
|---|---|
| SERVICE NOT COVERED | D1 |
| PRE-EXISTING CONDITION | D2 |
| OVER MAXIMUM BENEFIT | D3 |
| PER INS NOT MEDICALLY NECESSARY | D4 |
| AUTHORIZATION | D5 |
| UNTIMELY FILING | D6 |
| NON-PAR PROVIDER | D7 |
| PAID PER CONTRACT | D8 |
| UR IN-HOUSE DENIAL | D9 |
| BABY INCLUDED IN CASE RATE | D10 |
| APPEALED DENIAL UPHELD | D11 |
| INCORRECT AUTH # | D12 |
| PAYMENT RETRACTION | D13 |
| PMT SENT TO INSURED | D14 |
| PROCEDURE POSTPONED/CX | D15 |

901  902

1000
Table of Standard Activity Codes

FIG. 10

| ACTIVITY CODE | DESCRIPTION | PAR TYPE | Suppress from Bill/Stmt |
|---|---|---|---|
| BALP | BAL IS PT RESP,CHGD TO S/P | S | N |
| SCOV | VERIF SVC NOT COVD, TO S/P | S | N |
| CINS | CORR INS INFO & REBILLED | C | N |
| PREX | APPEALED FOR PRE-EXISTING | A | N |
| NCOV | PT NOT COV ,MOVE TO S/P | S | N |
| IBIN | ITEMIZED BILL SENT AS REQ | C | N |
| MREC | MED REC SENT AS REQUESTED | C | N |
| AREC | APPEAL FILED W/MED RECORDS | A | N |
| AAUT | APPEALED W/AUTH ON FILE&MED REC | A | N |
| ATIM | APPEALED W/PROOF OF TIMELY FILE | A | N |
| CHDX | MR REVISED DX/REBILLED | C | Y |
| PRCD | MR REVISED PROC/REBILLED | C | Y |
| CREV | REV CD REVISED/REBILLED | C | Y |
| HIDR | REBILLED FOR HIGH COST DRUGS | A | Y |
| ERRP | SENT ER RPT TO INS, AS REQ | C | N |
| DUPH | DENIAL UPHELD,BAL PT RESP | S | N |
| OKOK | VERIF INS PYMT IS CORRECT | C | Y |
| CSRT | BABY IN CSE RTE,PMT OK,ACT ADJ | ZERO | Y |
| MEOB | SENT CLAIM W/MCARE EOMB | C | N |
| BABY | CALLED GUAR/ADD BABY TO POLICY | C | N |
| 1500 | UB SENT FOR 1500 PROCES AS REQ | C | Y |
| URRV | CLM TO UR TO RVW/UPHLD DENIAL | A | Y |
| IMPL | REBILLED IMPLANT CHARGES | A | N |
| UNDR | REBILLED FOR UNDERPAYMENT | A | N |
| BORD | BORDER BABY,APPEALED | A | N |
| LITI | UR CNTST UPHLD DENL,REF TO BD | BD | Y |
| WLOS | UR CONCURS W/UPHLD DEN,ACCT ADJ | S | Y |
| PT10 | LTR TO PT TO CONTACT INS CO | C | N |
| MRDX | REQUESTED CORR DX CD FROM M/R | A | Y |
| MRPR | REQUESTED CORR PROC CD FROM M/R | A | Y |
| OVTR | APPEAL OVERTURNED/PMT PENDING | A | N |
| MEDR | REQUESTED MEDICAL RECORDS | A | Y |
| BPRO | CLAIM NOF/REBILLED 1500 ONLY | * | N |
| UB92 | CLAIM NOF/REBILLED UB92 ONLY | * | N |
| 2NDY | SECONDARY BILLING REQESTED | C | N |
| PINS | PATIENT REFERRED TO INS CO | C | N |
| FCMC | CHANGED PRIMARY TO MEDICARE | G | N |
| FCMK | CHANGED PRIMARY TO MEDICAID | G | N |
| FCHM | CHANGED PRIMARY TO HMO | C | N |
| FCPP | CHANGED PRIMARY TO PPO | C | N |
| FCCO | CHANGED PRIMARY TO COMMERCIAL | C | N |
| CMGR | AUTO CONTRACTUALIZATION CORR REQ | S | Y |
| FIL2 | BILLED SECONDARY PAYER | C | N |
| RECA | APPEAL RECEIVED/NO STATUS YET | A | N |
| INVR | IMPLANT INVOICE REQUESTED | A | Y |
| UNTM | UNTIMELY RESPONSE TO APPEAL | A | N |
| CSRP | CLAIM SENT TO TPA FOR RE-PRICING | C | N |
| UPTF | DENIAL UPHELD/TIMELY CLAIM FILING | S | Y |
| UPNA | DENIAL UPHELD/NO AUTH OBTAINED | S | Y |
| UPTA | DENIAL UPHELD/TIMELY APPEAL | S | Y |
| CRNS | CLAIM REC'D / NO STATUS AVAILABLE | C | N |

SYSTEM FOR PROCESSING UNPAID HEALTHCARE CLAIMS

CROSS-REFERENCE TO RELATED APPLICATIONS

The present application is a non-provisional application of provisional application having Ser. No. 60/423,471 filed by Mary Balogh on Nov. 4, 2002.

FIELD OF THE INVENTION

The present invention generally relates to managing the collection of unpaid receivable accounts for healthcare enterprises. More particularly, the present invention relates to a computerized system and method for processing the work in process management of activities associated with collecting on unpaid receivable accounts for healthcare enterprises.

BACKGROUND OF THE INVENTION

The cost of health care continues to increase as the health care industry becomes more complex, specialized, and sophisticated. The proportion of the gross domestic product that is accounted for by health care is expected to gradually increase over the coming years as the population ages and new medical procedures become available. Over the years, the delivery of health care services has shifted from individual physicians to large managed health maintenance organizations. This shift reflects the growing number of medical, dental, and pharmaceutical specialists in a complex variety of health care options and programs. This complexity and specialization has created large administrative systems that coordinate the delivery of health care between health care providers, administrators, patients, payers, and insurers. The cost of supporting these administrative systems has increased during recent years, thereby contributing to today's costly health care system.

A portion of administrative costs is represented by systems for creating, collecting, and adjudicating payment requests made by the healthcare provider. Such payment requests typically include bills for procedures performed and supplies given to patients. Processing the payment requests by the healthcare provider is a necessary component of the healthcare delivery process. However, systems for processing the payment requests also represent transaction costs that directly reduce the efficiency of the healthcare system. Reducing the magnitude of transaction costs involved in processing the payment requests by the healthcare provider would have the effect of reducing the rate of increase of health care costs. Moreover, streamlining payment request processing by the healthcare provider would also desirably increase the portion of the health care dollar that is spent on treatment rather than administration.

Several factors contribute to the traditionally high cost of health care administration, including the processing of payment requests. First, the volume of payment requests by healthcare providers is very high. Healthcare providers may process hundreds to thousands of payment requests each day and thousands to millions of requests annually. In addition, the contractual obligations between parties are complex and may change frequently. Often, there are many different contractual arrangements between different patients, insurers, and health care providers. The amount of authorized payment may vary by the service or procedure, by the particular contractual arrangement with each health care provider, by the contractual arrangements between the insurer and the patient regarding the allocation of payment for treatment, and by what is considered consistent with current medical practice.

Generally, in the collection process, the less time a collector spends in direct contact with a debtor, the greater likelihood a case remains unresolved and the costs to collect increases. The collection process typically consists of the following steps: a first letter requesting payment, a second letter requesting payment, phone calls requesting payment of the debt, a debtor's request for additional information, an appeal filed with the debtor, a financial background check on the debtor, an asset search, initiation of a suit, pretrial conference, trial, and resolution of the debt. Time and money expenditures increase with a resulting decrease in likelihood of recovery the farther along the collection process progressed through these steps. Without an automated routine, repetitive collector tasks such as copying, referrals, matching to file, memo generation and retrieving as well as a lack of automated scripted dispute handling, on line payment plan capabilities, electronic data transfer and, collection strategy development took away from the collector's time to spend in direct contact with a debtor. Further, when the case is referred to an outside collection agency or attorney, the costs to collect dramatically increase and the chances of recovery dramatically decrease.

More particularly, when a payer rejects or denies all or a portion of a claim, the payer typically returns an invoice/remittance or other written correspondence with an explanation of why the claim has been rejected or denied. Often, the received information is not handled effectively by the healthcare provider's cashier office, which traditionally has focused on the expeditious posting of cash. If the cashier does record the rejection/denial information accompanying the returned invoice or remittance to facilitate subsequent review, typically it does not trigger specific follow-up activity.

In some payment processing systems, rejection/denial codes have been used to focus personnel on outstanding issues. However, problems in these systems included: 1) using nonstandard rejection/denial codes, especially among multiple healthcare facilities thereby limiting the leverage of individual personnel, 2) assigning rejected/denied claims to specific personnel for follow up was done manually or done automatically on a periodic basis and not in real time, 3) processing of the rejection/denial information often required laborious, manual follow up procedures (e.g. individual retrieval and review of a lengthy payer contract, or a review of the remittance voucher or correspondence from the payer that had already been processed by other personnel), and 4) a lack of monitoring to ensure that personnel responded to the payers requests. In an attempt to maximize the number of payment request that are paid, personnel needed to spend inordinate amounts of time investigating unpaid receivable accounts. The time spent in such activities represents further efficiency losses in the health care system.

In view of the foregoing, would be desirable to provide a method and computerized system for managing healthcare receivable accounts. More specifically, it would be desirable to provide a system for substantially automating the work in process management of collection activities for healthcare receivable accounts. Accordingly, there is a need for a system and method for processing unpaid healthcare claims that overcomes these and other disadvantages of the prior systems.

SUMMARY OF THE INVENTION

A system and method processes unpaid healthcare claims related to reimbursement of a provision of healthcare to a patient in response to a rejection, a denial, or a lack of response to a submitted claim. An activity code is selected from a predetermined activity code set including codes identifying processing to be performed concerning rejected claim data in response to a received notification of a claim denial or rejection. The selected activity code is assigned to rejected claim data associated with the received notification. A task is scheduled, including performing processing concerning the rejected claim data, to derive corrected claim data including claim data supplemental to the rejected claim data and/or amended rejected claim data, in response to the assigned selected activity code. The corrected claim data is prepared for submission to a payer organization for payment.

These and other aspects of the present invention are further described with reference to the following detailed description and the accompanying figures, wherein the same reference numbers are assigned to the same features or elements illustrated in different figures. Note that the figures may not be drawn to scale. Further, there may be other embodiments of the present invention explicitly or implicitly described in the specification that are not specifically illustrated in the figures and visa versa.

BRIEF DESCRIPTION OF THE DRAWINGS

FIG. 7 illustrates a table of rejection reasons used by the rejection unit, as shown in FIG. 8, in accordance with a preferred embodiment of the present invention.

FIG. 9 illustrates a table of denial reasons used by the appeal unit, as shown in FIG. 8, in accordance with a preferred embodiment of the present invention.

FIG. 10 illustrates a table of standard activity codes used by the follow up unit, the rejection unit, and the appeal unit, as shown in the preceding figures, in accordance with a preferred embodiment of the present invention.

DETAILED DESCRIPTION OF THE PREFERRED EMBODIMENTS

Figure 1:
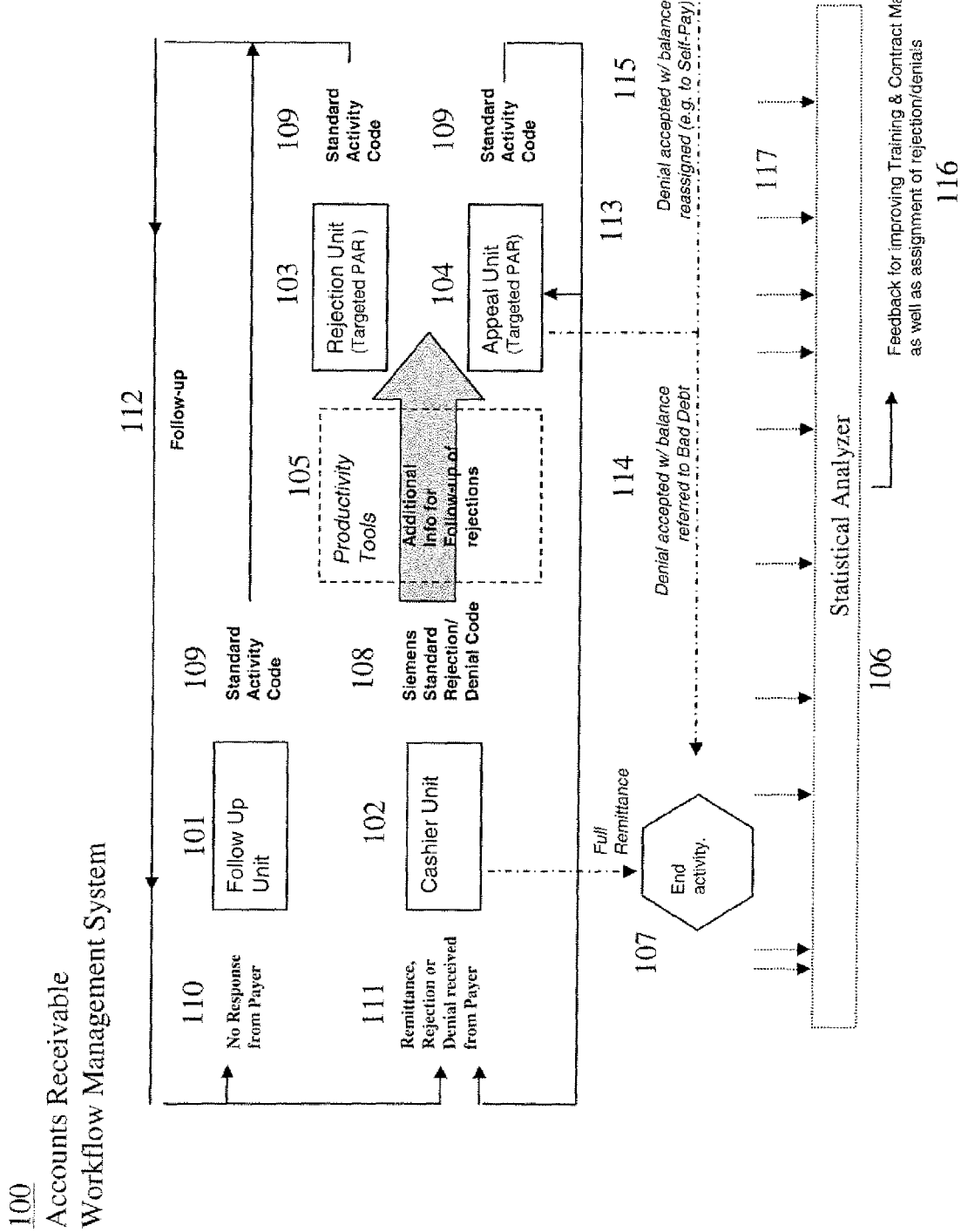
FIG. 1 illustrates an accounts receivable workflow management system, in accordance with a preferred embodiment of the present invention.

FIG. 1 illustrates an accounts receivable workflow management system 100, in accordance with a preferred embodiment of the present invention. The system 100 generally has four units including: a follow up unit 101, a cashier unit 102, a rejection unit 103, and an appeal unit 104. The workflow for the accounts receivable flows among these four units 101-104. Other elements of the system 100 include productivity tools 105, a statistical analyzer 106, and an end activity function 107. One or more elements or functions of the system 100 may be fully automated, partially automated and manual, or fully manual, depending on various business and technical considerations.

The system 100 is intended for use by a healthcare provider that is responsible for monitoring the health and/or welfare of people in its care. Examples of healthcare providers include, without limitation, a hospital, a nursing home, an assisted living care arrangement, a home health care arrangement, a hospice arrangement, a critical care arrangement, a health care clinic, a physical therapy clinic, a chiropractic clinic, and a dental office. In the preferred embodiment of the present invention, the healthcare provider is a hospital. Examples of the people being serviced by the healthcare provider include, without limitation, a patient, a resident, and a client.

After a person receives a provision of healthcare from the healthcare provider, the healthcare provider submits a payment request, otherwise called a submitted claim, bill, or invoice, to a payer for the provision of healthcare that the person received. A claim is an instrument used by insurance companies, for example, to recognize services and related changes, but a claim does not create an absolute expectation of payment. Further, claim data includes data representing a claim. In contrast, a bill (typically directed to a guarantor of other fiscally responsible party) is an expectation of payment. The provision of healthcare includes healthcare services and/or supplies. The payer may be any person or business entity that pays for the service and/or supplies that the person received. Examples of the payer include, without limitation, the person themselves, another person, an insurance company, another company, and the like. The payment requests that are outstanding are referred to the accounts that are payable to the healthcare provider. These accounts are otherwise called accounts receivable, receivable accounts, unpaid claims, unpaid bills, unpaid invoices, accounts outstanding, and the like. The workflow management system 100 processes the accounts receivable that are due from the payer.

The workflow for the accounts receivable typically begins with either the follow up unit 101 or the cashier unit 102. If no response is received from a payer 110 after submitting a payment request to the payer, the follow up unit 101 assigns a standard activity code 109 to the lack of response and follows up with the payer 112. The follow up needed may be generated by the follow up unit 101 itself for by one of the other three units. The content of the follow up communication includes, without limitation, an inquiry, a confirmation, a request, a response, and the like. The method of the follow up communication includes, without limitation, a letter, an email, a facsimile, a phone call, or a personal visit.

If a response is received from the payer 111, the cashier unit 102 receives the response from the payer. Preferably, the cashier unit 102 is the first and only unit to receive all responses from all payers to help control the process. Alternatively, other units may be the first unit to receive and to process responses from one or more payers, as discussed hereinbelow. The response may be a full remittance for the payment due, as requested in the payment request, a full or partial rejection of the payment request, a full or partial denial of the payment request, or other communication. Preferably, the response received from the payer 111 includes a standard activity code 109 representing a nonpayment code associated with a predetermined set of nonpayment codes.

If the cashier unit 102 receives full remittance for the payment due, then the cashier unit 102 records or posts the remittance as received from the payer, and the workflow continues to the end activity function 107, wherein the activity with the payer for that particular payment request stops.

If the cashier unit 102 receives a full or partial rejection of the payment request, then the cashier unit 102 records any partial remittance received and assigns an internal rejection activity code 108, for example from the table 700 shown in FIG. 7, to the rejection communication and forwarded to the rejection unit 103. The internal rejection activity code 108 may be used for any reason including, without limitation, providing efficient assignment of similar issues to specialized patient account representatives (PAR) in the rejection unit 103. Real time or near real time queuing of the rejections with a PAR in the system 100 responsive to the internal rejection activity code facilitates prompt activity-based follow up. Preferably, rejections are not an official denial of payment by the payer. Preferably, rejections are a notification from the payer to the healthcare provider that the payer requires additional or correct information before the payer can process the payment request for ultimate payment or denial of payment.

Preferably, accounts receivable having rejections posted are assigned to work queues in the rejection unit 103 based on the type of response required including, without limitation, billing corrections, patient contact, claim attachments, and payer contact. Preferably, these accounts receivable are grouped by specific rejection type rather than by specific payer. For example, all rejections that are requesting an itemized bill are directed to the same work queue, thereby enabling the task to be handled with the most efficient productivity. The patient account representative (PAR) assigned to this queue prints the itemized bills, sends them to the payer(s), and assigns a standard activity code 109 on the account noting that this task was completed. Preferably, the assignment of the standard activity code 109 is partially or completely automated.

If the cashier unit 102 receives a full or partial denial of the payment request, then the cashier unit 102 records any partial remittance received and assigns an internal denial activity code, for example from the table 900 shown in FIG. 9, to the denial communication and forwarded to the appeal unit 104. The internal denial activity code may be used for any reason including, without limitation, providing efficient assignment of similar issues to specialized patient account representatives (PAR) in the appeal unit 104 based on the specific payer and sorted by denial type. Real time or near real time queuing of the denials with a PAR in the system 100 responsive to the internal denial activity code facilitates prompt activity-based follow up. Denials are a notification from the payer that the payer is denying payment of the payment request. Rejections are a notification from the payer that the payer is rejecting the payment request. The difference between denials and rejections is that the payer absolutely will not pay on the payment request for a denial, and that the payer may pay on the payment request for a rejection if the reason for the rejection is corrected. Hence, rejections and denials are segregated by the cashier unit 102, and assigned to the rejection unit 103 or the appeal unit 104 for further investigation and processing. The patient account representatives (PAR) in the appeal unit 104 reviews the denied claim, files an appeal including any necessary attachments, and assigns a standard activity code to the account. Preferably, the appeal unit 104 files the appeal within a predetermined period of time after receiving the denied claim. Almost every state in the United States of America has specific laws governing the time allowed for the filing an appeal, which default in the payer's favor if not met by the healthcare provider. The appeal filing process ensures that the predetermined time filing an appeal is met, and prompts the payer to respond to the appeal in a timely manner. The documentation of activity with standard codes provides an efficient method to date stamp each account.

Preferably, in each of the rejection unit 103 and the appeal unit 104, the standard activity code 109 directs the accounts receivable to a separate queue handled by the follow up unit 101 for follow up with the payer. The standard activity code 109 for the rejection or denial communications is otherwise referred to as a predetermined nonpayment activity code, a known activity code, a public activity code, an industry activity code, an open activity code, and the like. The follow up patient account representative (PAR) assigned to this queue knows ahead of time or by looking at the account status that the rejection or denial has been received, and that information was requested by the payer and sent by the rejection unit 103 or the appeal unit 104, respectively. This advanced knowledge of the account status information advantageously gives the patient account representative (PAR) credibility and confidence when communicating with the payer to move the account to a payment processing status. Alternatively, a patient account representative (PAR) in the rejection unit 103 or the appeal unit 104 may follow up with the response to the rejection or denial, respectively.

Preferably, the internal activity code 108 is internal to the workflow management system 100 and is not know by or needed by the payer. The internal activity code 108 for the rejection or denial communications is otherwise referred to as a proprietary activity code, a private activity code, a company activity code, an intermediate activity code, a nonpayment activity code, and the like. Preferably, the assignment of the internal activity code 108 is completely automated, especially when payers comply with Health Insurance Portability and Accountability Act (HIPAA) requirements to include standard activity codes with electronic remittances. In this case, HIPAA standard activity codes 109 are mapped or translated to a smaller (e.g., less redundant) set of internal activity codes 108. For example, the AR workflow management system 100 translates the nonpayment code received by the cashier unit 102 to an internal activity code 108 compatible with a predetermined nonpayment code set 109 employed by an organization processing the claim data for reimbursement of provision of healthcare to the patient. Preferably, the standard activity codes permit the healthcare provider and the payer to efficiently communicate using codes that have well understood meanings common to the provider and the payer.

Each of the rejection unit 103 and the appeal unit 104 may use productivity tools 105 to get additional information related to the rejection or denial of the payment request. The productivity tools 105 include any type of tool including, without limitation, standard patient accounting tools such as integrated eligibility service and contract management. Preferably, based on the assigned internal activity code, the productivity tools 105 are automatically triggered to gather additional information necessary for resolution of the rejection and/or denial. Examples of additional information include, without limitation, itemized bills for services and/or supplies, patient information, hospital provider information, and the like.

Each of the rejection unit 103 and the appeal unit 104 assigns a standard activity code 109, as shown in the table 1000 in FIG. 10, to the rejection or denial of the payment request and returns a communication to the payer. Preferably, the assignment of the standard activity code 109 is partially or completely automated.

The appeal unit 104 may choose to accept the denial of the payment request with the balance referred to a bad debt account 114, wherein the workflow stops with the end activity function 107, or to accept the denial of the payment request with the balance reassigned to another payer 115, such as the person that received the healthcare provisions.

Each of the follow up unit 101, the cashier unit 102, the rejection unit 103, and the appeal unit 104 reports data to the statistical analyzer 106 to generate output data 116 responsive to processing the received data 117. By recording and analyzing the received data 117, especially the rejection and/or denial information, the system 100 can identify recurring issues by incident and/or dollar volumes. The output data 116 may be used to provide feedback for one or more of the follow up unit 101, the cashier unit 102, the rejection unit 103, and the appeal unit 104. Such feedback may be used for various purposes including, without limitation, training, contract management, assignment of the rejection and/or denial response to the appropriate queues. Examples of statistics analyzed by the statistical analyzer 106 include, without limitation: type and frequency of rejections encountered including a sort by payer and comparison with system average, type and frequency of denials encountered including a sort by payer and comparison with system average, percentage of remittances paid in full including a sort by payer and comparison with system average, average percentage of claim paid including a sort by payer and comparison with system average, time required to process claim including a sort by payer and comparison with system average, time required to work denied claim including a sort by payer and comparison with system average, time required to work rejected claim including a sort by payer and comparison with system average, and percentage of claims written to bad debt including a sort by payer and comparison with system average.

Figure 2:
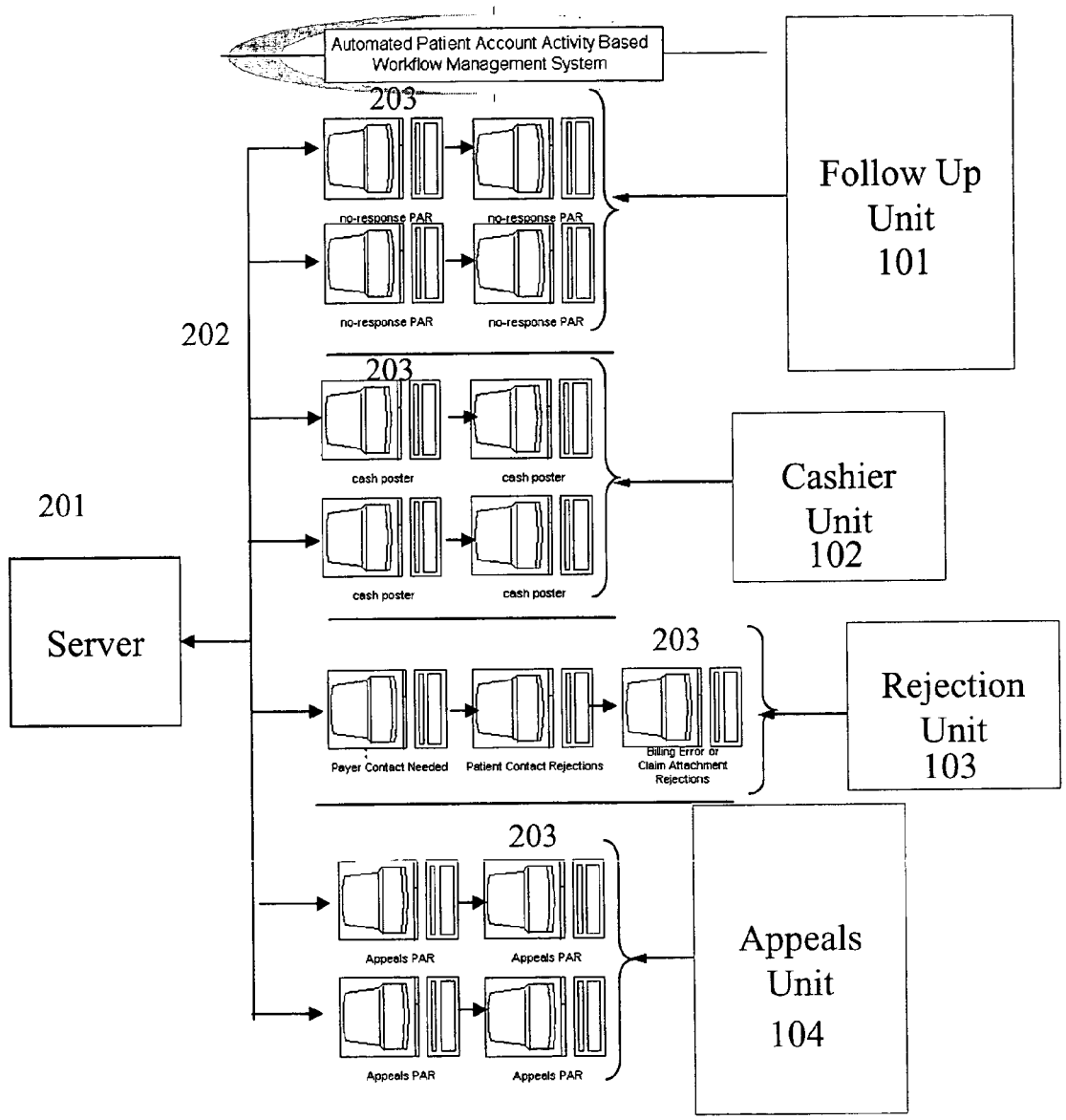
FIG. 2 illustrates a diagrammatic view of accounts receivable workflow management units used in the accounts receivable workflow management system, as shown in FIG. 1, in accordance with a preferred embodiment of the present invention.

FIG. 2 illustrates a diagrammatic view of accounts receivable workflow management units 200 used in the accounts receivable workflow management system 100, as shown in FIG. 1, in accordance with a preferred embodiment of the present invention. The system 100 includes the follow up unit 101, the cashier unit 102, the rejection unit 103, and the appeal unit 104. Preferably, the system 100 is a local area network (LAN) and/or a wide area network (WAN) including at least one server 201, otherwise called a workstation or a central computer, and a plurality of clients 203, otherwise called personal computers, desktop computers, and the like. The server 201 and the clients 203 may be mobile or fixed devices and may communicate over wired or wireless communication links 202. Preferably, the server 201 and the clients 203 are fixed computers and the communication link 202 is a wired connection.

For example, FIG. 2 illustrates the clients 203 as fixed desktop computers. The follow up unit 101 includes, for example, four desktop computers described as "no response patient account representative (PAR)." The cashier unit 102 includes, for example, four desktop computers described as "cash poster." The rejection unit 103 includes, for example, three desktop computers described as "payer contact needed," "patient contact rejections," and "billing error or claim attachment rejections," which represent three corresponding workflow queues. The appeal unit 104 includes, for example, four desktop computers described as "appeals patient account representative (PAR)."

Figure 3:
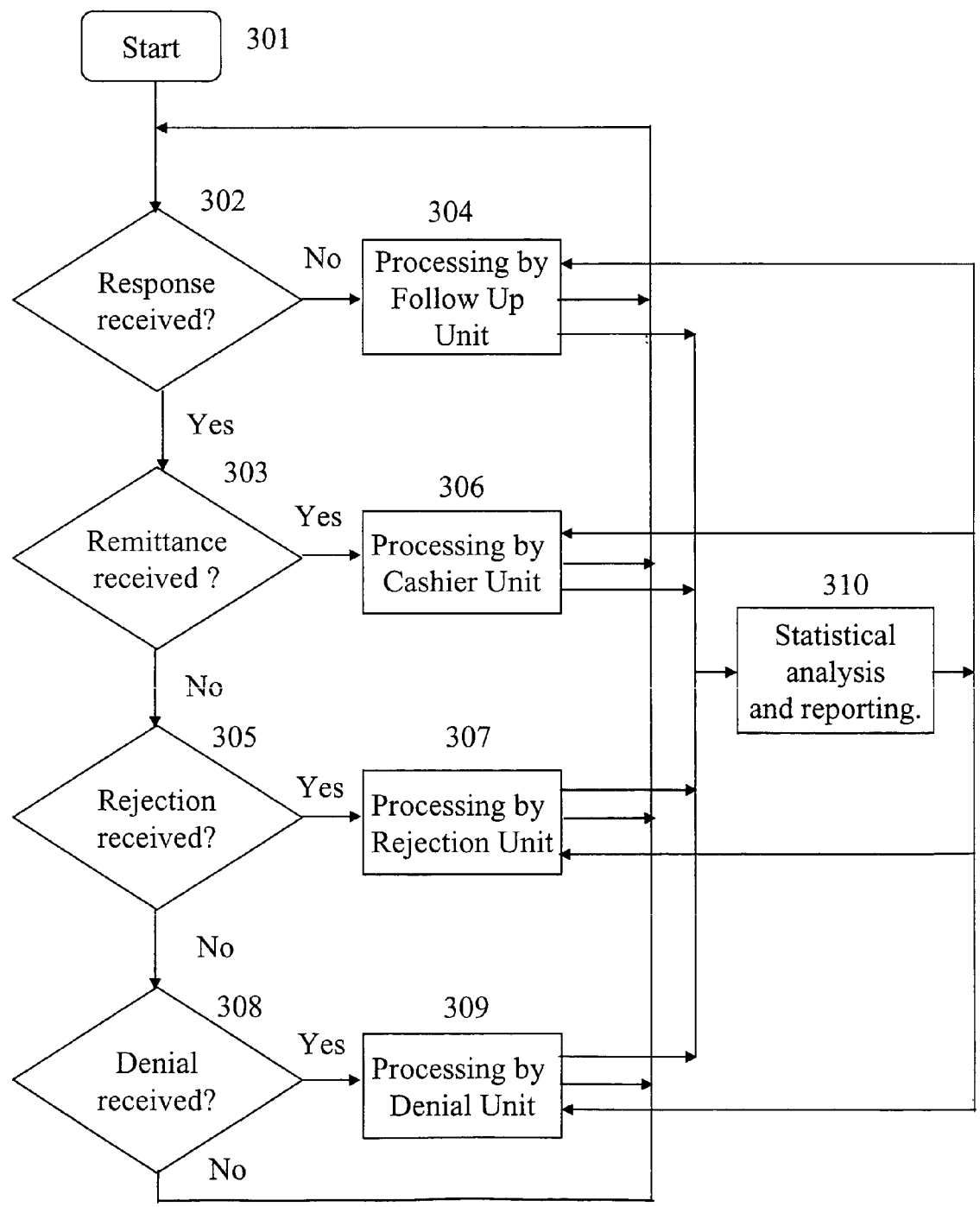
FIG. 3 illustrates an accounts receivable workflow management process for the accounts receivable workflow management system, as shown in FIG. 1, in accordance with a preferred embodiment of the present invention.

FIG. 3 illustrates an accounts receivable workflow management process 300 for the accounts receivable workflow management system 100, as shown in FIG. 1, in accordance with a preferred embodiment of the present invention.

At step 301, the process starts.

At step 302, the system 100 determines whether a response from the payer is received. If a response from the payer is received, then the process 300 continues to step 303; otherwise, the process 303 continues to step 304.

At step 303, the system 100 determines whether a remittance from the payer is received. If a remittance from the payer is received, then the process 300 continues to step 306; otherwise, the process 303 continues to step 305.

At step 304, the system 100 initiates processing by the follow up unit 101. After processing by the follow up unit 101 at step 304, the process returns to step 302. Further, data related to the processing by the follow up unit 101 is provided to the statistical analyzer 106 for statistical analysis and reporting at step 310.

At step 305, the system 100 determines whether a rejection from the payer is received. If a rejection from the payer is received, then the process 300 continues to step 307; otherwise, the process 303 continues to step 308.

At step 306, the system 100 initiates processing by the cashier unit 102. After processing the cashier unit 102 at step 306, the process returns to step 302. Further, data related to the processing by the cashier unit 102 is provided to the statistical analyzer 106 for statistical analysis and reporting at step 310.

At step 307, the system 100 initiates processing by the rejection unit 103. After processing the rejection unit 103 at step 307, the process returns to step 302. Further, data related to the processing by the rejection unit 103 is provided to the statistical analyzer 106 for statistical analysis and reporting at step 310.

At step 308, the system 100 determines whether a denial from the payer is received. If a denial from the payer is received, then the process 300 continues to step 309; otherwise, the process 303 returns to step 302.

At step 309, the system 100 initiates processing by the appeal unit 104. After processing the appeal unit 104 at step 309, the process returns to step 302. Further, data related to the processing by the appeal unit 104 is provided to the statistical analyzer 106 for statistical analysis and reporting at step 310.

At step 310, the system 100 initiates statistical analysis and reporting by the statistical analyzer 106 responsive to receiving data from one or more of the follow up unit 101, the cashier unit 102, rejection unit 103, and the appeal unit 104. Preferably, the results of the statistical analysis by the statistical analyzer 106 is fed back to one or more of the follow up unit 101, the cashier unit 102, rejection unit 103, and the appeal unit 104 to improve the processes in the system 100. Preferably, the results of the statistical analysis by the statistical analyzer 106 are also reported for an individual payer to determine, for example, the status of the accounts receivable for the payer.

Although, FIG. 3 illustrates the workflow management process 300 in a simplified flowchart, FIG. 3 inherently includes other functions described with reference to FIG. 1. For example, step 306 inherently includes the end activity function 107 shown in FIG. 1. Further, FIG. 3 also includes inter-relational functions between the four various units, as described with reference to FIG. 1, such as, for example, the decision by the appeal unit 104 to refer to bad debt 114 and/or to reassign the balance 115.

Figure 4:
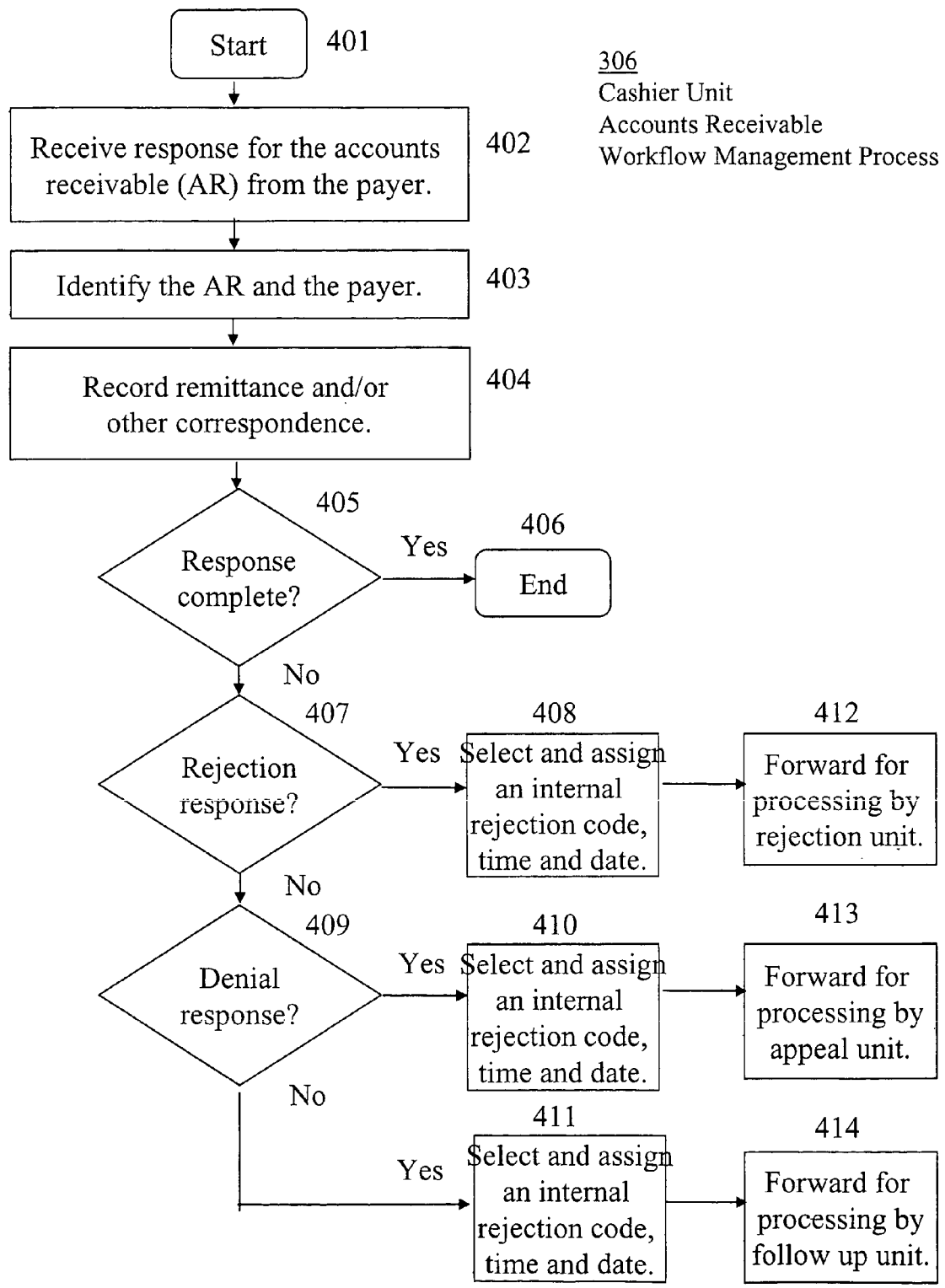
FIG. 4 illustrates an accounts receivable workflow management process for the cashier unit, as shown in FIG. 3, in accordance with a preferred embodiment of the present invention.

FIG. 4 illustrates an accounts receivable workflow management process 308 for the cashier unit 102, as shown in FIG. 3, in accordance with a preferred embodiment of the present invention.

At step 401, the process starts.

At step 402, the cashier unit 102 receives a response for the accounts receivable (AR) from the payer. Preferably, the response is a remittance for payment in full for the amount due. When the response is not a remittance for payment in full for the amount due, the cashier unit 102 processes the response according to the description in steps 405-414.

Preferably, at step 402, the cashier unit 102 receives all responses directly from the payer, even those responses that are responding to a communication from the follow up unit 101, the rejection unit 103, or the appeal unit 104. This centralized response receipt workflow helps to ensure that all responses from all payers are received at a common address, well know to the payers, promptly recorded (i.e., docketed or logged in), and internal activity codes assigned.

Alternatively, at step 402, the system 100 may use a distributed response receipt workflow, wherein each of the follow up unit 101, the rejection unit 103, or the appeal unit 104 may receive intermediate responses from payers to resolve specific accounts receivable issues. In other words the follow up unit 101, the rejection unit 103, or the appeal unit 104 may communicate directly with the payers, without the intermediate communication being received through the cashier unit 102. This distributed response receipt workflow helps to off-load the volume of intermediate responses processed by the cashier unit 102.

Still alternatively, at step 402, the system 100 may use a combination of centralized and distributed response receipt workflow, as described above, depending on various factors such as, for example, the content of communication, the type of communication, the timing of the communication, and the like. For example, the cashier unit 102 may receive an initial rejection or denial response from a payer, record the response, assign the internal activity code, and forward the response to the rejection unit 103 or the appeal unit 104. Then, it may be more efficient for the patient account representative (PAR) of the rejection unit 103 or the appeal unit 104 may communicate directly with the payer to focus in on a particular accounts payable issue to reach a resolution.

At step 403, the cashier unit 102 identifies the accounts receivable and the payer. A portion of the accounts receivable information identified includes a standard activity code representing nonpayment of the claim.

At step 404, the cashier unit 102 records the remittance and/or other correspondence. At step 405, the cashier unit 102 determines whether the response from the payer is complete. If the response is complete, the process continues to step 406; otherwise, if the process is not complete, the process continues to step 407.

At step 406, the process ends the accounts receivable activity for the particular payment request that was paid by the payer. This step corresponds to element 107 in FIG. 1.

At step 407, the cashier unit 102 determines whether the response from the payer is a rejection of the payment requested. If the response is a rejection of the payment requested, the process continues to step 408; otherwise, if the process is not a rejection of the payment requested, the process continues to step 409.

At step 408, the cashier unit 102 assigns an internal rejection code 108 to the response. Preferably, the internal rejection code 108 assigned relates to a standard activity code representing nonpayment of the claim. Preferably, the number of internal rejection codes 108 is less than the number of standard activity code representing nonpayment of the claim. Preferably, the cashier unit 102 also assigns a time and date identifier to the rejected claim data associated with the received notification for the accounts receivable. The identifier indicates a time and date indicative of one or more of: (a) a time and date associated with scheduling a task comprising performing processing concerning the rejected claim data, (b) a time and date associated with processing the received notification of claim denial or rejection, (c) a time and date associated with receiving notification of claim denial or rejection, and (d) a time and date identifying expiration of a period assigned to complete performance of the processing concerning said rejected claim data. The cashier unit 102 may further initiate generation of a message alerting a user to one or more of: (a) the period is due to expire at the time and date assigned, and (b) the period has expired. Then, the process 306 continues to step 412.

At step 409, the cashier unit 102 determines whether the response from the payer is a denial of the payment requested. If the response is a denial of the payment requested, the process continues to step 410; otherwise, if the process is not a rejection of the payment requested, the process continues to step 411.

At step 410, the cashier unit 102 assigns an internal denial code 108 to the response. Preferably, the internal rejection code 108 assigned relates to a standard activity code representing nonpayment of the claim. Preferably, the number of internal rejection codes 108 is less than the number of standard activity code representing nonpayment of the claim. Preferably, the cashier unit 102 also assigns a time and date identifier to the rejected claim data associated with the received notification for the accounts receivable, as described above under step 408. Then, the process 306 continues to step 413.

At step 411, the cashier unit 102 assigns an internal follow up code 108 to the response. Preferably, the internal rejection code 108 assigned relates to a standard activity code representing nonpayment of the claim. Preferably, the number of internal rejection codes 108 is less than the number of standard activity code representing nonpayment of the claim. Preferably, the cashier unit 102 also assigns a time and date identifier to the rejected claim data associated with the received notification for the accounts receivable, as described above under step 408. Then, the process 306 continues to step 414.

At step 412, the cashier unit 102 forwards the response to the rejection unit 103 for processing by the rejection unit 103.

At step 413, the cashier unit 102 forwards the response to the appeal unit 104 for processing by the appeal unit 104.

At step 414, the cashier unit 102 forwards the response to the follow up unit 101 for processing by the follow up unit 101. Note that steps 411 and 414 illustrate an alternative that is not described in FIGS. 1-3. FIGS. 1-3 assume that the response received from the payer by the cashier unit 102 will be a full remittance, or a partial or no remittance along with a rejection or a denial. Practically, the majority, or almost all, of the responses should fall into one of these anticipated responses. However, steps 411 and 414 anticipate the case where the response falls outside one of these anticipated responses that represent unanticipated or oddball responses. Such unanticipated responses may not be a formal rejection or denial, but merely a request for missing information. Practically, the number of unanticipated responses should be very small. In FIG. 4, the cashier unit 102, via steps 411 and 414 has the option to route the response to the follow up unit 101. Alternatively, the system 100 may eliminate steps 411 and 414 and cause the cashier unit 102 to treat the small percentage of unanticipated responses as rejections to be forwarded to the rejection unit 103 for processing.

Figure 5:
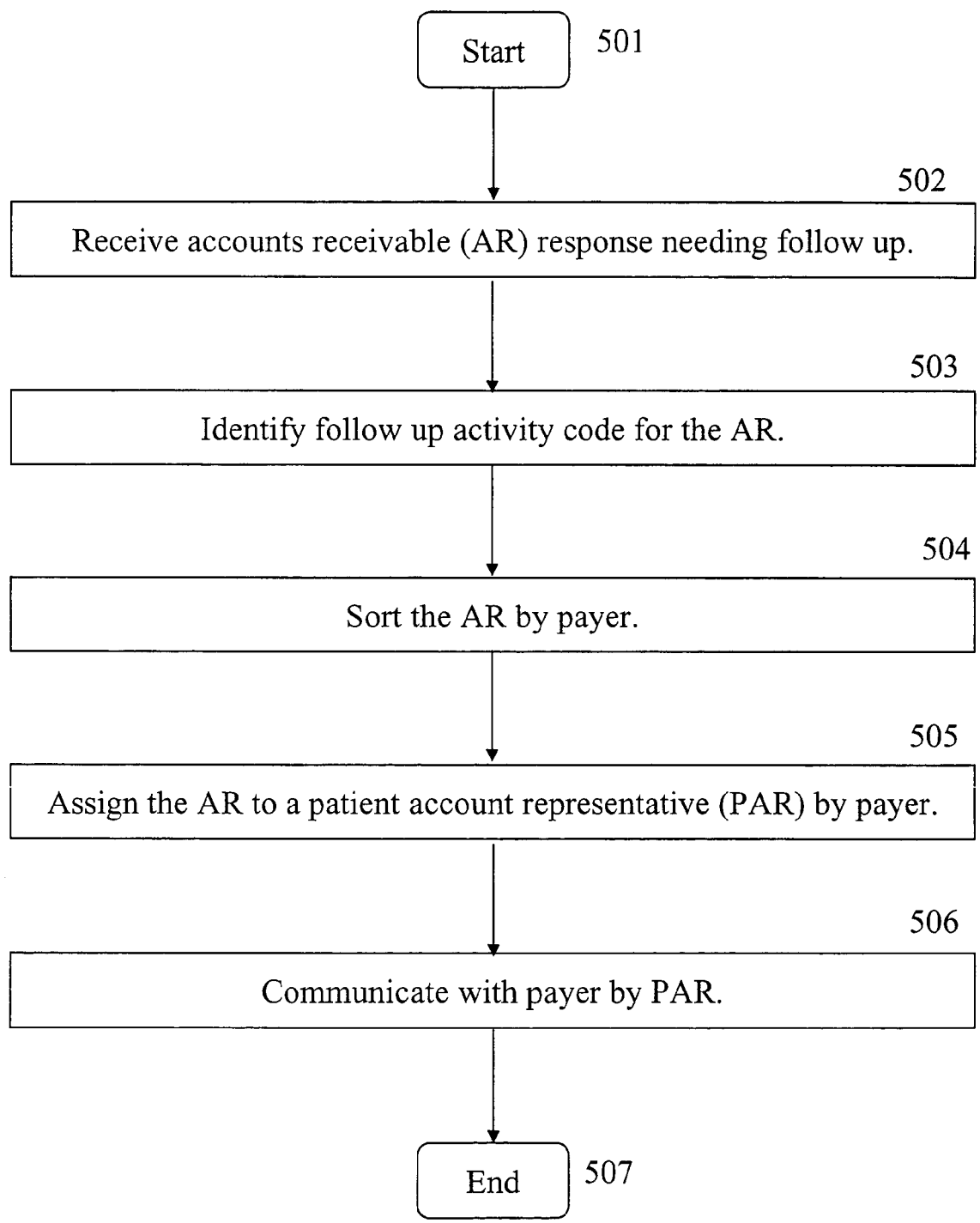
FIG. 5 illustrates an accounts receivable workflow management process for the follow up unit, as shown in FIG. 3, in accordance with a preferred embodiment of the present invention.

FIG. 5 illustrates an accounts receivable workflow management process 304 for the follow up unit 101, as shown in FIG. 3, in accordance with a preferred embodiment of the present invention.

At step 501, the process starts.

At step 502, the follow up unit 101 receives the accounts receivable (AR) needing follow up. The accounts receivable (AR) needing follow up may be received from one or more of the cashier unit 102, the rejection unit 103, and the appeal unit 104. Further, the accounts receivable (AR) may be received from the follow up unit 101 itself in the sense that the system 100 automatically identifies the accounts receivable (AR) for follow up, and the follow up unit 101 receives notice of that automatic identification from the system 101. Preferably, the server 101 generates the automatic identification of the accounts receivable (AR) needing follow up.

At step 503, the follow up unit 101 identifies the follow up activity code for the accounts receivable. The follow up activity code may be the internal activity code 108 or the standard activity code 109, depending on the particular activity needing follow up and depending on the unit that assigned the activity code.

At step 504, the follow up unit 101 sorts the accounts receivable by the name of the payer.

At step 505, the follow up unit 101 assigns the accounts receivable to a patient account representative (PAR) according to the payer's name. Preferably, it is more efficient for a patient account representative (PAR) to follow up with multiple accounts receivable issues with the same payer at the same time.

At step 506, the follow up unit 101 communicates with the payer about the accounts receivable via the patient account representative (PAR).

At step 507, the process ends.

Figure 6:
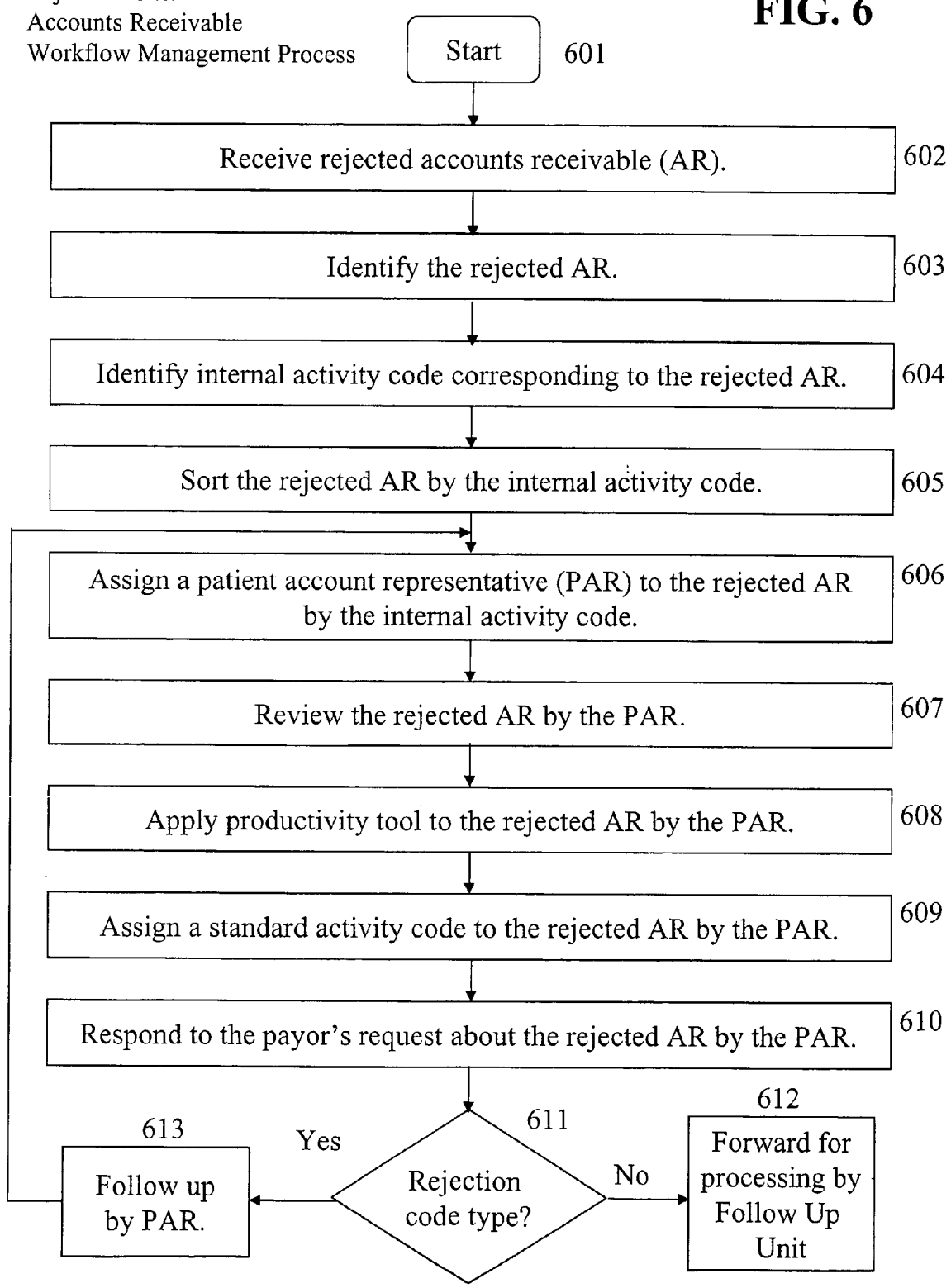
FIG. 6 illustrates an accounts receivable workflow management process for the rejection unit, as shown in FIG. 3, in accordance with a preferred embodiment of the present invention.

FIG. 6 illustrates an accounts receivable workflow management process 307 for the rejection unit 103, as shown in FIG. 3, in accordance with a preferred embodiment of the present invention.

At step 601, the process starts.

At step 602, the rejection unit 103 receives the rejected accounts receivable (AR). Preferably, the rejection unit 103 receives the rejected accounts receivable (AR) from the cashier unit 102, as described above. Alternatively, the rejection unit 103 receives the rejected accounts receivable (AR), from the payer directly, as described above.

At step 603, the rejection unit 103 identifies the rejected accounts receivable.

At step 604, the rejection unit 103 identifies an internal activity code 108 corresponding to the rejected accounts receivable.

At step 605, the rejection unit 103 sorts the rejected accounts receivable by the internal activity code 108.

At step 606, the rejection unit 103 assigns a patient account representative (PAR) to the rejected accounts receivable according to the internal activity code. Preferably, rejected accounts receivable are assigned according to the internal rejection activity code because it is efficient for the PAR to handle rejected accounts receivable of the same kind, rather than handle multiple rejected accounts receivable of various types.

At step 607, the rejection unit 103 reviews the rejected accounts receivable via the patient account representative.

At step 608, the rejection unit 103 applies one or more productivity tool to the rejected accounts receivable via the patient account representative. The productivity tools may be applied manually, automatically, or a combination thereof. Preferably, the productivity tools help the PAR efficiently retrieve additional information needed to properly respond to the payer.

At step 609, the rejection unit 103 assigns a standard activity code to the rejected accounts receivable via patient account representative. The standard activity code assigned to the rejected accounts receivable permits the healthcare provider and the payer to efficiently communicate using codes that have well understood common meanings.

At step 610, the rejection unit 103 responds to the payer's request about the rejected accounts receivable via the patient account representative. The response includes any information including, without limitation, corrected claim data including claim data supplemental to the rejected claim data and/or amended claim data.

At step 611, the rejection unit 103 determines whether the rejected accounts receivable needs follow up by the follow up unit 101 or the rejection unit 103 responsive to the assigned standard activity code. If the rejected accounts receivable needs follow up by the follow up unit 101, then the process continues to step 612; otherwise, if the rejected accounts receivable needs follow up by the rejection unit 103, then the process continues to step 613.

At step 612, the rejection unit 103 forwards the rejected accounts receivable to the follow up unit 101 for follow up.

At step 613, the rejection unit 103 returns the rejected accounts receivable to the patient account representative in the rejection unit 103 for follow up. After step 613, the process 307 returns to step 606.

Figure 8:
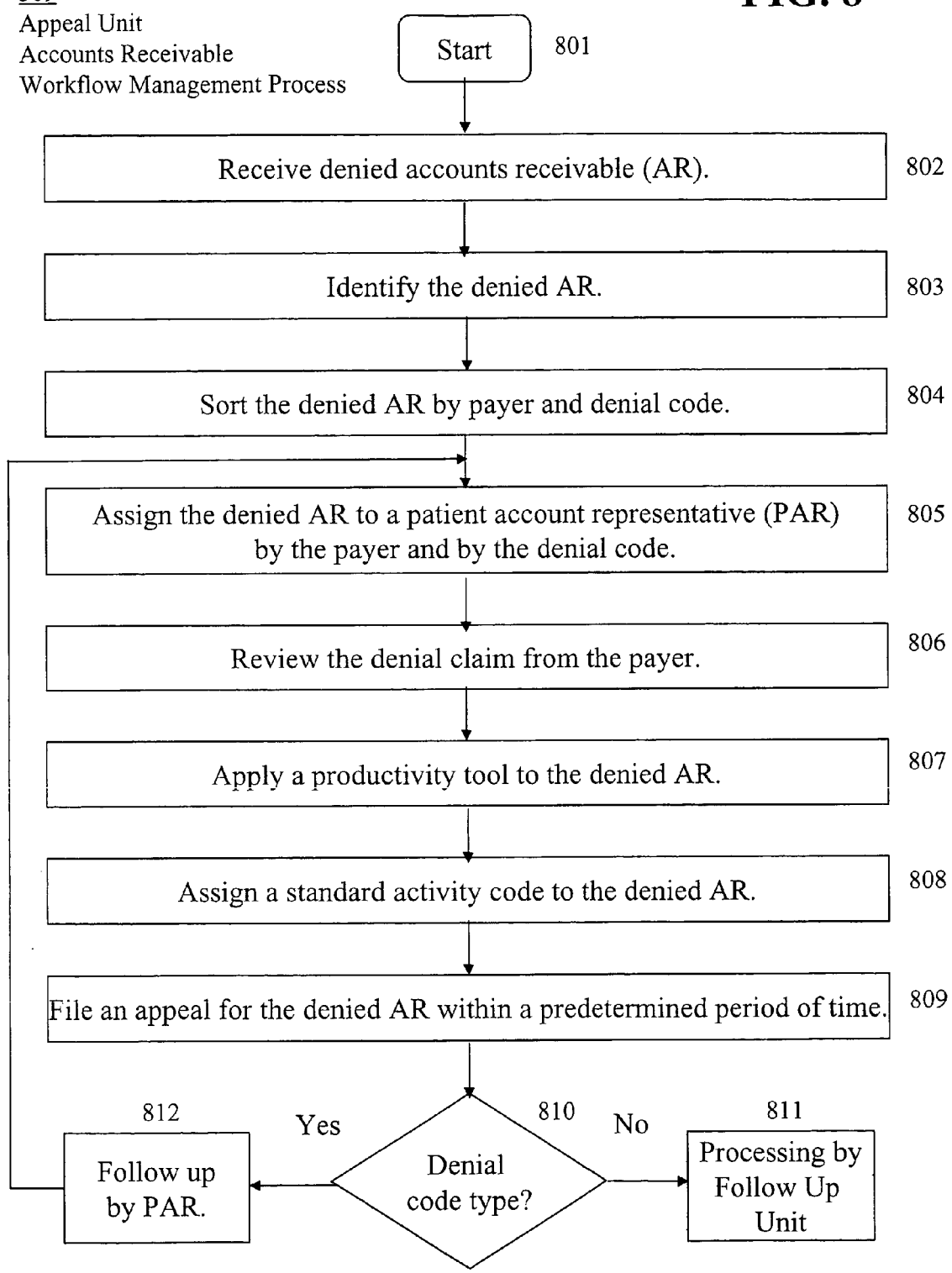
FIG. 8 illustrates an accounts receivable workflow management process for the appeal unit, as shown in FIG. 3, in accordance with a preferred embodiment of the present invention.

FIG. 7 illustrates a table 700 of rejection reasons 701 used by the rejection unit 103, as shown in FIG. 8, in accordance with a preferred embodiment of the present invention. The table 700 includes a list of rejection reasons 701, and the rejection unit's 103 activity responsive 702 to each rejection reason 701. Preferably, a rejection reason 701 has only one corresponding activity 702, but may have more than one, especially when patient contact is needed, as shown in table 700. Preferably, the rejection reasons 701 are abbreviated because there is the character string is limited to thirty characters. Rejection reasons 701 and/or activities 702 may be added or deleted from the table 700, based on the feedback from the statistical analyzer 106 or based on other considerations. A character swing, representing an alpha and/or a numeric rejection activity code 702, also corresponds to (i.e., represents or identifies) each rejection reason 701 to facilitate efficient, standardized, or automated processing. Alternatively, the rejection reasons 701 may not have pre-assigned denial activity codes 902 because they may be assigned by individual work sites (e.g., based on availability of transaction codes in a given range).

FIG. 8 illustrates an accounts receivable workflow management process 309 for the appeal unit 104, as shown in FIG. 3, in accordance with a preferred embodiment of the present invention.

At step 801, the process starts.

At step 802, the appeal unit 104 receives the accounts receivable denied by the payer. Preferably, the appeal unit 104 receives the denied accounts receivable (AR) from the cashier unit 102, as described above. Alternatively, the appeal unit 104 receives the rejected accounts receivable (AR), from the payer directly, as described above.

At step 803, the appeal unit 104 identifies the denied accounts receivable

At step 804, the appeal unit 104 sorts the denied accounts receivable by the payer and the denial code.

At step 805, the appeal unit 104 assigns the denied accounts receivable to a patient account representative (PAR) by the payer and by the denial activity code. Preferably, denied accounts receivable are assigned according to the internal denial activity code because it is efficient for the PAR to handle denied accounts receivable of the same kind for the same payer.

At step 806, the appeal unit 104 reviews the denial claim from the payer via the patient account representative.

At step 807, the appeal unit 104 applies a productivity tool to the denied accounts receivable. The productivity tools may be applied manually, automatically, or a combination thereof. Preferably, the productivity tools help the PAR efficiently retrieve additional information needed to properly respond to the payer.

At step 808, the appeal unit 104 assigns a standard activity code to the denied accounts receivable. The standard activity code assigned to the denied accounts receivable permits the healthcare provider and the payer to efficiently communicate using codes that have well understood common meanings.

At step 809, the appeal unit 104 files an appeal with the payer for the denied accounts receivable within a predetermined period of time. The appeal includes any information including, without limitation, corrected claim data including claim data supplemental to the rejected claim data and/or amended claim data.

At step 810, the appeal unit 104 determines whether the denied accounts receivable needs follow up by the follow up unit 101 or the appeal unit 104 responsive to the assigned standard activity code. If the denied accounts receivable needs follow up by the follow up unit 101, then the process continues to step 811; otherwise, if the denied accounts receivable needs follow up by the appeal unit 104, then the process continues to step 812.

At step 811, the appeal unit 104 forwards the denied accounts receivable to the follow up unit 101 for follow up.

At step 812, the appeal unit 104 returns the denied accounts receivable to the patient account representative in the appeal unit 104 for follow up. After step 812, the process 309 returns to step 805.

FIG. 9 illustrates a table 900 of denial reasons 901 used by the appeal unit 104, as shown in FIG. 8, in accordance with a preferred embodiment of the present invention. The table 900 includes a list of denial reasons 901 that correspond to the appeal unit's 104 activity responsive to each denial reason 901. Preferably, a denial reason 901 has only one corresponding activity, but may have more than one, especially when patient contact is needed. Preferably, the denial reasons 901 are abbreviated because there is the character string is limited to thirty characters. Denial reasons 901 and/or activities may be added or deleted from the table 900, based on the feedback from the statistical analyzer 106 or based on other considerations. A character string, representing an alpha and/or a numeric denial activity code 902, also corresponds to (i.e., represents or identifies) each denial reason 901 to facilitate efficient, standardized, or automated processing. Alternatively, the denial reasons 901 may not have pre-assigned denial activity codes 902 because they may be assigned by individual work sites (e.g., based on availability of transaction codes in a given range).

FIG. 10 illustrates a table 1000 of standard activity codes 109 used by the follow up unit 101, the rejection unit 103, and the appeal unit 104, as shown in the preceding figures, in accordance with a preferred embodiment of the present invention. The table 1000 includes a list of standard activity codes (column one) and corresponding descriptions (column two), PAR types (column three) and an indication to suppress from bill statement (column four). Standard activity codes 109 may be added or deleted from the table 900, based on various considerations, such as HIPAA requirements. Preferably, the standard activity codes 109 are alpha and/or numeric combinations. The patient account representative (PAR) type represents the group or queue of PARs that are prepared to handle the accounts receivable corresponding to the description. Under the PAR type, "S" represents a self pay PAR, "C" represents a no response PAR, "A" represents the appeals unit, "Zero" represents that an account will be paid in full, "BD" represents a bad debt agency assignment, and "G" represents a governmental PAR. The indication to suppress from bill statement represents whether the corresponding standard activity code will be shown in the bill statement. Under the indication to suppress from bill statement, N represents that the standard activity code will be shown in the bill statement, and Y the standard activity code will not be shown in the bill statement.

In summary of the preferred embodiment of the present invention, the workflow management system 100 advantageously provides a computerized system and a method for processing the work in process management of activities associated with collecting on unpaid receivable accounts for healthcare enterprises. The workflow management system 100 provides the following advantages including, without limitation:

1. A clear distinction between rejections (e.g., due to missing information or documentation) and denials allows prompt, directed follow-up.
2. Standard rejection/denial activity codes expedite routing of claims.
3. Internal rejection/denial activity codes facilitate leveraging of productivity tools (e.g., contract management, eligibility service, patient identification check) that can automatically gather or verify required information.
4. An appeal unit 104 or corresponding system logic ensures quick assignment of an appropriate, standardized activity code.
5. A rejections unit 103 or corresponding system logic ensures quick assignment of an appropriate, standardized activity code.
6. Internal rejection/denial activity codes further increase follow-up specificity, allowing PARs to be leveraged across accounts, payers, and facilities to improve claim efficiency.
7. Exception reports allow management to identify accounts for which payer requests for information have been posted, but no response by the healthcare provider has yet been recorded.
8. Activity triggered follow up workflow allows screening of accounts for which no requests/response from payer has been recorded. These accounts can be managed by a set of dedicated PARs for efficient follow-up.
9. Integrated statistical analysis captures data to provide feedback for the system to enhance system operation.
10. Real time posting of rejection/denial information prompts real time processing and follow up. For example, prompt responses to a payer's request for additional information on claims generates cash and account resolution in a timely manner.

Hence, while the present invention has been described with reference to various illustrative embodiments thereof, the present invention is not intended that the invention be limited to these specific embodiments. Those skilled in the art will recognize that variations, modifications, and combinations of the disclosed subject matter can be made without departing from the spirit and scope of the invention as set forth in the appended claims.

What is claimed is:

1. A method for processing claim data for reimbursement of provision of healthcare to a patient in response to rejection, denial, or lack of response to a submitted claim, comprising the steps of:

employing at least one computer system for, automatically selecting an internal activity code from a predetermined internal activity code set specific to a particular organization and including a plurality of codes identifying processing to be performed concerning rejected claim data in response to a received notification of claim denial or rejection;

automatically assigning said selected internal activity code to rejected claim data associated with said received notification;

automatically scheduling a task comprising performing processing concerning said rejected claim data to derive corrected claim data including at least one (a) claim data supplemental to said rejected claim data and (b) amended rejected claim data, in response to said assigned selected internal activity code; and preparing said corrected claim data by including a standard activity code from a standard activity code set different to said internal activity code set and facilitating compatible communication between said particular organization and a payer organization for submission to said payer organization for payment.

2. A method according to claim 1, wherein said predetermined internal activity code set is different from a set of codes identifying a nonpayment reason associated with said rejected claim data comprising at least one of, (a) a rejection reason, (b) a rejection activity code representing the rejection reason, (c) a denial reason, and (d) a denial activity code representing the denial reason.

3. A method according to claim 1, including the step of receiving a nonpayment code comprising at least one of, (a) a rejection code and (b) a denial code associated with said rejected claim data, and said selecting step comprises interpreting said received nonpayment code to determine, from said predetermined internal activity code set, an internal activity code compatible with said nonpayment code.

4. A method according to claim 1, including the steps of receiving a nonpayment code of a nonpayment code set comprising at least one of, (a) a rejection code and (b) a denial code associated with said rejected claim data, and interpreting said received nonpayment code, translating said interpreted received nonpayment code to said standard activity code compatible with said standard activity code set.

5. A method according to claim 4, including the step of translating said interpreted received nonpayment code to an internal activity code wherein said internal activity code set comprises fewer codes than said predetermined nonpayment code set.

6. A method according to claim 1, including the step of assigning a time and date identifier to rejected claim data associated with said received notification, said identifier indicating a time and date indicative of at least one of, (a) a time and date associated with scheduling a task comprising performing processing concerning said rejected claim data, (b) a time and date associated with processing said received notification of claim denial or rejection, (c) a time and date associated with receiving notification of claim denial or rejection and (d) a time and date identifying expiration of a period assigned to complete performance of said processing concerning said rejected claim data.

7. A method according to claim 1, including the steps of assigning a time and date identifying expiration of a period assigned to complete performance of said processing concerning said rejected claim data and initiating generation of a message alerting a user to at least one of, (a) said period is due to expire at said time and date and (b) said period has expired.

8. A method according to claim 1, wherein said method is used to provide corrected claim data for a plurality of rejected claims in response to a corresponding plurality of received notifications of claim denial or rejection and including the step of collating data concerning said rejected claims by at least one of, (a) payer organization associated with said notification and (b) reason for claim rejection or denial derived from said notification.

9. A method according to claim 1, wherein said method is used to provide corrected claim data for a plurality of rejected claims in response to a corresponding plurality of received notifications and including the step of automatically collating rejected claim data by at least one of, (a) payer organization associated with said notification, (b) assigned activity code and (c) type of request for information indicated in a corresponding notification.

10. A method according to claim 1, including the step of acquiring statistics concerning at least one of, (a) type and frequency of claim rejections, (b) type and frequency of claim denials, (c) data identifying success rate of first time claims submissions for an individual payer, (d) data indicating a time duration expected for processing of a submitted claim for an individual payer, (e) data indicating a time duration expected for processing a non-paid claim until re-submission and (f) data identifying a proportion of non-recoverable claims for an individual payer.

11. A method according to claim 10, including the step of employing said statistics to at least one of, (i) modify processing of said rejected claim data and (ii) create a statistical report for an individual payer.

12. A method according to claim 1, including the step of determining from said notification whether said rejected claim data was accompanied by a denial or rejection notification and wherein said selecting step comprises selecting a first internal activity code in response to a denial notification and a different second internal activity code in response to a rejection notification.

13. A method according to claim 1, wherein said method steps are performed automatically and at least one of, (a) excluding manual intervention and (b) employing partial manual intervention by one or more healthcare workers.

14. A method for processing claim data for reimbursement of provision of healthcare to a patient in response to rejection, denial, or lack of response to a submitted claim, comprising the steps of:

employing at least one computer system for, identifying a nonpayment code, associated with a predetermined nonpayment code set, from a received notification of claim nonpayment associated with particular claim data; automatically selecting an internal activity code from a predetermined internal activity code set including a plurality of codes specific to a particular organization and identifying processing to be performed concerning non-paid claim data in response to said identified nonpayment reason;

automatically assigning said selected internal activity code to said particular claim data associated with said received notification;

automatically adding a task to a task list of a worker comprising performing processing concerning said particular claim data to derive corrected claim data including at least one (a) claim data supplemental to said rejected claim data and (b) amended rejected claim data, in response to said assigned selected internal activity code; and preparing said corrected claim data by including a standard activity code from a standard activity code set different to said internal activity code set and facilitating compatible communication between said particular organization and a payer organization for submission to said payer organization for payment.

15. A method according to claim 14, wherein said identified nonpayment code comprises at least one of, (i) a rejection code and (ii) a denial code associated with said particular claim data, and said selecting step comprises interpreting said identified nonpayment code to determine, from said predetermined internal activity code set, an internal activity code compatible with said nonpayment code.

16. A method according to claim 14, wherein
said predetermined nonpayment code set is compatible with a HIPAA standard code set.

17. A system for processing claim data for reimbursement of provision of healthcare to a patient in response to rejection, denial, or lack of response to a submitted claim, comprising:

a workflow processor for, automatically selecting an internal activity code from a predetermined internal activity code set specific to a particular organization and including a plurality of codes identifying processing to be performed concerning rejected claim data in response to a received notification of claim denial or rejection;

automatically assigning said selected internal activity code to rejected claim data associated with said received notification;

automatically adding a task to a task list of a worker comprising performing processing concerning said rejected claim data to derive corrected claim data including at least one (a) claim data supplemental to said rejected claim data and (b) amended rejected claim data, in response to said assigned selected internal activity code; and an interface processor for preparing said corrected claim data by including a standard activity code from a standard activity code set different to said internal activity code set and facilitating compatible communication between said particular organization and said payer organization for submission to a payer organization for payment.

* * * * *